United States Patent Office 3,649,406
Patented Mar. 14, 1972

3,649,406
IMPROVEMENTS IN OR RELATING TO FIBROUS INSULATING MATERIALS
Thomas Gordon McNish, "Silverton," 27 Silver St., Buckden, Huntingdonshire, England
No Drawing. Filed Dec. 12, 1969, Ser. No. 884,722
Claims priority, application Great Britain, Dec. 16, 1968, 59,719/68
Int. Cl. B28b *13/06*
U.S. Cl. 156—245      14 Claims

ABSTRACT OF THE DISCLOSURE

In a method of making a fibrous insulating material consisting of, for example, ceramic fibres, a mass of fibrous filaments is first treated to the action of a binding agent such as a silica sol and thereafter a part or the whole of the surface of the material is sprayed with an adherent coating or layer of a metal oxide such as alumina.

---

This invention relates to fibrous insulating materials used for heat or sound insulation purposes and, in the case of heat insulation, particularly in connection with equipment or apparatus in which very high temperatures are encountered.

Various problems exist in providing efficient heat insulation in apparatus subjected to very high temperatures and in which there is a high rate of hot gas flow. Thus, in the case of a gas turbine used, for example, for driving a heavy road vehicle, such as a lorry, it is desirable to provide a heat insulating medium in the duct leading from the gas turbine and through which very hot gases flow at a high temperature. The surface of the insulating medium exposed to the hot gases must be subject to no, or a minimum of, erosion and it must also be such that it will not break down to form dust which is deleterious to the operation of the turbine.

The objects of the invention include the provision of insulating material which meets the requirements referred to and can be manufactured in a simple manner, lending itself to large scale production and affording a high degree of insulation in addition to being capable of a wide range of uses.

According to the present invention a method of making a fibrous insulating material comprises the steps of treating a mass of fibrous filaments to the binding action of a silica sol and thereafter spraying a part or the whole of the surface of the material with an adherent coating or layer of a metal oxide.

Preferably the fibrous insulating material consists of ceramic filaments, and the adherent layer or coating is of alumina.

In carrying out the invention, the metal oxide is applied to the fibrous material, which may be pre-formed to assume any desired shape, for example by vacuum forming, in the form of a spray produced by, for example, a spray gun.

Alternative methods of producing an insulating material embodying the invention will now be described in greater detail as examples.

Fibrous material consisting of a mass of filaments of ceramic has good insulating qualities but for most purposes requires some form of mechanical support or binding in order to maintain it in position. The material itself cannot be used as, for example, a heat insulating lining on, say, the interior wall of a hot gas flow passage in a gas turbine engine. Unsuccessful attempts have been made to use metal foil or thin metal sheeting to encase insulating material such as blankets of ceramic fibre to prevent dusting or erosion of the surface of the material. It is also known to stabilise fibrous filaments mechanically by treating them with a binding or stiffening agent.

In applying the present invention to ceramic filaments or fibres treated with a binding agent such as silica sol, a spray gun is used to coat the material with a layer of a metal oxide such as alumina or zirconia. The thickness of the layer so applied will depend upon requirements but for the general purposes of the invention it is thought that the thickness may range from $5/1000$ to $25/1000$ of an inch. The body of ceramic filaments or fibres may be pre-formed to any desired shape depending on the purpose to which it is to be put, before the metal oxide is applied to it. For example, the process known as vacuum forming may be used to produce desired shapes from filaments in a suspension, the shapes so produced being subsequently sprayed with a selected metal oxide.

In one method of carrying out the invention, a mass of ceramic fibres produced for example from china clay as formed into a blanket one inch in thickness and having a density of 8 lbs. per cubic foot and the mass is coagulated by saturation with a silica sol containing up to 35% by weight of solids diluted with about 50% water. The wet blanket so produced is applied to a mould of suitable shape and slowly dried in a stream of hot air.

When dry, the surface of the now stiffened blanket is again treated with the silica sol and dried more quickly so that a higher concentration of silica is formed on the exposed surface of the blanket because, after the initial treatment, the blanket will not absorb so much of the binding fluid throughout its thickness. When fully dried, the surface of the blanket is coated with a layer of alumina by a spray process applied by a conventional spray gun, the alumina being in the form of a rod, sheathed powder or powder, depending on the type of spray gun used. When contained in a sheath the powder and sheath form a flexible rod consisting of compacted powdered alumina encased in a tube of plastics material. The plastics material used is fusible so that on the application of a flame to the end of the tube the plastics material is burnt up and the powder melted to form a surface coating on the blanket.

In an alternative method of carrying out the invention, a blanket or other shape is produced using as the main material chopped ceramic fibre produced from, for example china clay, with a minimum fibre length of about ⅛ inch. Care should be exercised to avoid reducing the fibres to dust. Since one square foot of the blanket weighs about 320 grams it is possible to calculate the weight of chopped fibre to equal 1 inch thickness of the fibre in blanket form. The chopped fibre is saturated with a solution of colloidal silica and applied to a mould as already described. Alternatively, the chopped fibres can be mixed with a larger quantity of silica sol to form a slurry and this can be fed to a vacuum forming machine to produce the desired shape. After drying, the shaped body is removed from the machine and its surface is sprayed with ceramic as previously described.

The density of the finished product will be determined by specific requirements and may vary from about 8 lbs. per cubic foot up to 20 lbs. or more per cubic foot, the final density of the product advantageously being 14 lbs. per cubic foot. The density may be controlled by selection of the concentration of the silica sol, by selection of the amount of liquid allowed to remain in the mixture after vacuum forming or by further treatment of the formed shapes, after initial drying, with extra silica.

Where only a simple shape of product is required it may be completely formed as described but final products of complex shape are preferably built up from several simpler shapes secured together by an adhesive, such as a high temperature resistant glue. When building up an insulator in the duct of a gas turbine for example, separately made parts are assembled with their abutting faces angled at 45°, the adhesive being applied to these faces. The inclined abutting faces are so disposed in the duct that they are inclined rearwardly with respect to the direction of flow of the hot gases and the insulator composed of the assembled parts may be secured in position by glue applied to its outer surface which contacts the wall of the duct.

Materials of suitable shape and made either with blankets composed of unchopped fibres or with vacuum formed chopped ceramic fibres treated and made as described have successfully been tested at temperatures of and in excess of 750° C. combined with gas flows of and in excess of 500 feet per second. The materials described have also been subjected successfully to vibration conditions having a force of 6 g. at rates of 32 cycles per minute for prolonged periods. The materials described, however formed, but equivalent to an original blanket thickness of 1 inch have proved capable of reducing the temperature between the hot gas and the reverse side of the insulating material from 700° C. to 195° C.

The invention is applicable to fibrous materials other than those composed of ceramic fibre or filaments, for example, mineral fibres or mixtures of selected fibres may be used. Again sheets of asbestos or shapes formed from asbestos may be coated with a metal oxide as described and so provide an insulating material for selected purposes.

The use of a metal oxide provides additional heat protection to that provided by the fibrous material. A further advantage is that inert metal oxides give better erosion and corrosion resistance where circumstances of use call for such requirements.

Although reference has been made to a particular fibrous material composed of a mass of filaments, the invention is applicable to woven fibres, in particular silica type fibres, and again, while particular metal oxides have been referred to, it will be clear that others may be used, depending on particular requirements.

It will be apparent that insulating material made in accordance with the invention is capable of a very wide range of uses including, for example, furnace linings, gas generating and circulating plants and heat exchangers. Again, insulating material made in accordance with the invention is very effective as a sound insulator with especially advantageous application for silencing purposes in aircraft or motor car or lorry engines. The hard ceramic coating on the material resists erosion under conditions of high rates of hot gas flow. The degree of stiffening of the blanket of ceramic fibres may be varied depending on the requirements of mechanical strength compared with required insulating or sound absorbtion properties.

For sound insulating testing, a ½ inch thick coating of stiffened and sprayed blanket of a similar density to that previously referred to has been applied to a commercially available lorry silencer and has produced favourable results.

Instead of using a spray gun gas flame for melting the coating powder, a plasma gun may be employed when powders having a very high melting point are used. The electric arc heat source in a plasma gun provides the requisite high temperatures.

I claim:
1. A method of making an insulating lining for a gas turbine duct comprising in combination making separate portions of said lining each by the steps of mixing a quantity of chopped fibrous filaments with a sufficient quantity of silica sol to produce a slurry, treating a quantity of the slurry to a vacuum forming process to produce a body shaped to correspond with a portion of said lining, coating the surface of said body with an adherent layer of a metal oxide, and assembling said shaped portions to constitute said lining.

2. A method of making an insulating lining for a gas turbine duct comprising in combination making separate portions of said lining each by the steps of forming a mass of fibrous filaments into a blanket, saturating said blanket with a silica sol, applying the blanket to a mould shaped to correspond with a portion of said lining, drying the shaped portion so produced, coating the surface of said shaped portion with an adherent layer of a metal oxide, and assembling said shaped portions to constitute said lining.

3. A method of making an insulating lining for a gas turbine according to claim 2 in which said mass of fibrous filaments includes a mixture of ceramic fibres and mineral fibres.

4. A method of making a body of insulating material comprising in combination the steps of forming a mass of a mixture of ceramic fibres and mineral fibres into a blanket, saturating the blanket so formed with a silica sol, applying the saturated blanket to a mould, drying the blanket and thereafter coating the surface of the blanket with an adherent layer of a metal oxide.

5. A method of making a body of insulating material comprising in combination the steps of mixing a quantity of chopped fibrous filaments with sufficient silica sol to produce a slurry, treating a quantity of the slurry to a vacuum forming process to produce a body of desired shape and thereafter spraying the surface of the body with a metal oxide.

6. A method of making a body of insulating material according to claim 5, in which said quantity of chopped fibrous filaments includes a mixture of ceramic fibres and mineral fibres.

7. A method of making a body of insulating material comprising in combination the steps of forming a mass of fibrous filaments into a blanket, saturating the blanket so formed with a silica sol, applying the saturated blanket to a mould, drying the blanket and thereafter coating the surface of the blanket with an adherent layer of a metal oxide.

8. A method of making a body of insulating material according to claim 7, in which the metal oxide is alumina.

9. A method of making a body of insulating material according to claim 7, in which the metal oxide is zirconia.

10. A method of making a body of insulating material comprising in combination the steps of forming a mass of ceramic filaments into a blanket, saturating the blanket so formed with a silica sol containing up to 35% by weight of solids diluted with water, applying the saturated blanket to a mould, drying the blanket by hot air, applying further silica sol to the surface of the dried blanket, drying the surface so treated and thereafter coating the surface of the blanket with an adherent layer of a metal oxide.

11. A method of making a body of insulating material according to claim 10, in which the metal oxide is alumina.

12. A method of making a body of insulating material according to claim 10, in which the metal oxide is zirconia.

13. A method of making a body of insulating material as claimed in claim 10, in which the mass of filaments is formed into a blanket 1 inch in thickness and having a density of 8 pounds per cubic foot.

14. A method of making a body of insulating material according to claim 13, in which the thickness of the layer of metal oxide applied to the surface of the blanket is within the range of $5/1000$ to $25/1000$ of an inch.

References Cited

UNITED STATES PATENTS

| | | | |
|---|---|---|---|
| 2,924,537 | 2/1960 | Wallis et al. | 117—71 X |
| 2,861,911 | 11/1958 | Martin et al. | 117—71 R X |
| 3,009,041 | 11/1961 | Zlupko | 117—105.2 X |
| 3,077,413 | 2/1963 | Campbell | 117—126 AI X |
| 2,966,423 | 12/1960 | Shichman | 117—71 X |
| 3,031,331 | 4/1962 | Aves, Jr. et al. | 117—105.2 X |
| 2,920,001 | 1/1960 | Smith et al. | 117—105.2 X |
| 3,243,313 | 3/1966 | Aves, Jr. | 117—105.2 X |

ALFRED L. LEAVITT, Primary Examiner

C. K. WEIFFENBACH, Assistant Examiner

U.S. Cl. X.R.

117—69, 93.1 PF, 105.2, 126 GF, 126 AF; 156—181, 285, 325, 329; 264—87, 128, 131, 136, 137